Sept. 20, 1966 H. M. MERRILL ET AL 3,274,573
MAGNETIC TRANSDUCER
Filed Aug. 21, 1961

INVENTORS.
HENRY M. MERRILL
GARDNER P. WILSON
BY
Christie, Parker & Hale
ATTORNEYS.

MAR 15 1966

United States Patent Office 3,274,573

Patented Sept. 20, 1966

3,274,573

MAGNETIC TRANSDUCER

Henry M. Merrill, Altadena, and Gardner P. Wilson, Arcadia, Calif., assignors to Burroughs Corporation, Detroit, Mich., a corporation of Michigan Filed Aug. 21, 1961, Ser. No. 132,677
8 Claims. (Cl. 340—174.1)

Figure 1:
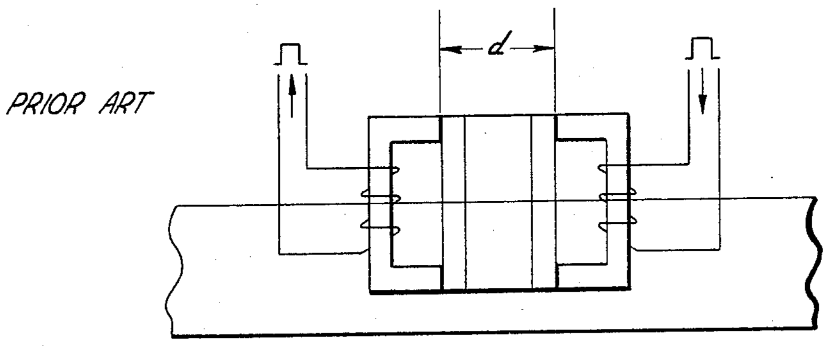

This invention relates to magnetic transducers and, more particularly, to a magnetic head for simultaneously reading and writing on a magnetic carrier.

In present day digital data processing systems and operations it is highly desirable to check the signal recorded on a magnetic carrier against the desired signal with a minimum time delay to eliminate any possible sources of error. The magnetic carriers employed in these digital systems have taken the form of the multiple track magnetic tapes utilizing high density recording techniques. The advantage of simultaneously reading and writing from a magnetic carrier, or providing a "write-check" feature, is that the number of elements of a computing system can be minimized if the time delay interval between writing and reading can be substantially reduced, as well as accelerating the rate at which the digital information is delivered to a magnetic carrier. This reduction in time delay has been achieved largely through the incorporation of the reading and writing functions into a single magnetic transducer or package. The time delay is dependent on the spacing between the writing transducer and the reading or "checking" transducer. This spacing and, therefore, the time delay, particularly when a single read-write transducer is employed, is governed by the cross-coupling between the writing structure and the reading structure. Various techniques, both packaging and electrical techniques, have been devised for reducing this cross-coupling or cross-talk between transducing structures. The packaging techniques have included shielding between transducing gaps both within the transducer proper and external shielding. From an electrical standpoint, the cross-talk has been minimized through the use of electrical configurations to effectively cancel out the cross-coupling between read and write portions. An example of this type of magnetic structure is found in Patent No. 2,969,529. None of these techniques have produced a commercially satisfactory read-write transducer.

In addition to the cross-coupling problems for producing a read-write or dual gap transducer, physical considerations of the magnetic structures and manufacture of the transducer and the components thereof must be considered to produce a practical, commercially acceptable magnetic transducer exhibiting simultaneous read and write capabilities. A commercially acceptable magnetic transducer must have an inter-gap spacing to provide this read-write or write-check operation on the order of two milliseconds, particularly when employed in data processing systems.

This invention provides an improved and electrically efficient magnetic transducer incorporating read and write portions in a single structure in which the transducing gaps are spaced apart on the order of .150 inch and the cross-coupling is minimized. The electromagnetic structures for the read and write portions of the dual gap head are defined to provide independent, closed loop flux paths that are oriented with respect to one another at approximately 90 degrees to cause a substantial portion of the flux emanating from one of said transducing portions to link the other transducing portion at approximately 90 degrees and thereby minimize the cross-talk or cross-voltage induced therein. In addition, the electromagnetic structure is defined in a fashion to allow a pair of reading windings to be arranged on the structure in a magnetic relationship tending to cause them to balance out or buck out any stray flux coupled thereto while providing the desired reading action.

Structurally, the invention comprises a non-magnetic body mounting a magnetic shielding member, a pair of olbong, low reluctance, closed loop electromagnetic structures each having a high reluctance transducing portion therein arranged on opposite sides of the shielding member with a portion in engagement with the opposite sides of the shielding member whereby the shielding member effectively controls the inter-gap or spacing between the high reluctance transducing portions. The electromagnetic structures can be further characterized as being oriented with respect to the magnetic shielding member at an angle of approximately 45 degrees to provide the desired minimum cross-coupling between the magnetic structures and the windings mounted thereon. The thus spaced transducing gaps of each electromagnetic structure are arranged in alignment on an exposed portion of the non-magnetic body to effect a transducing or write-check operation on a magnetic carrier.

Figure 2:
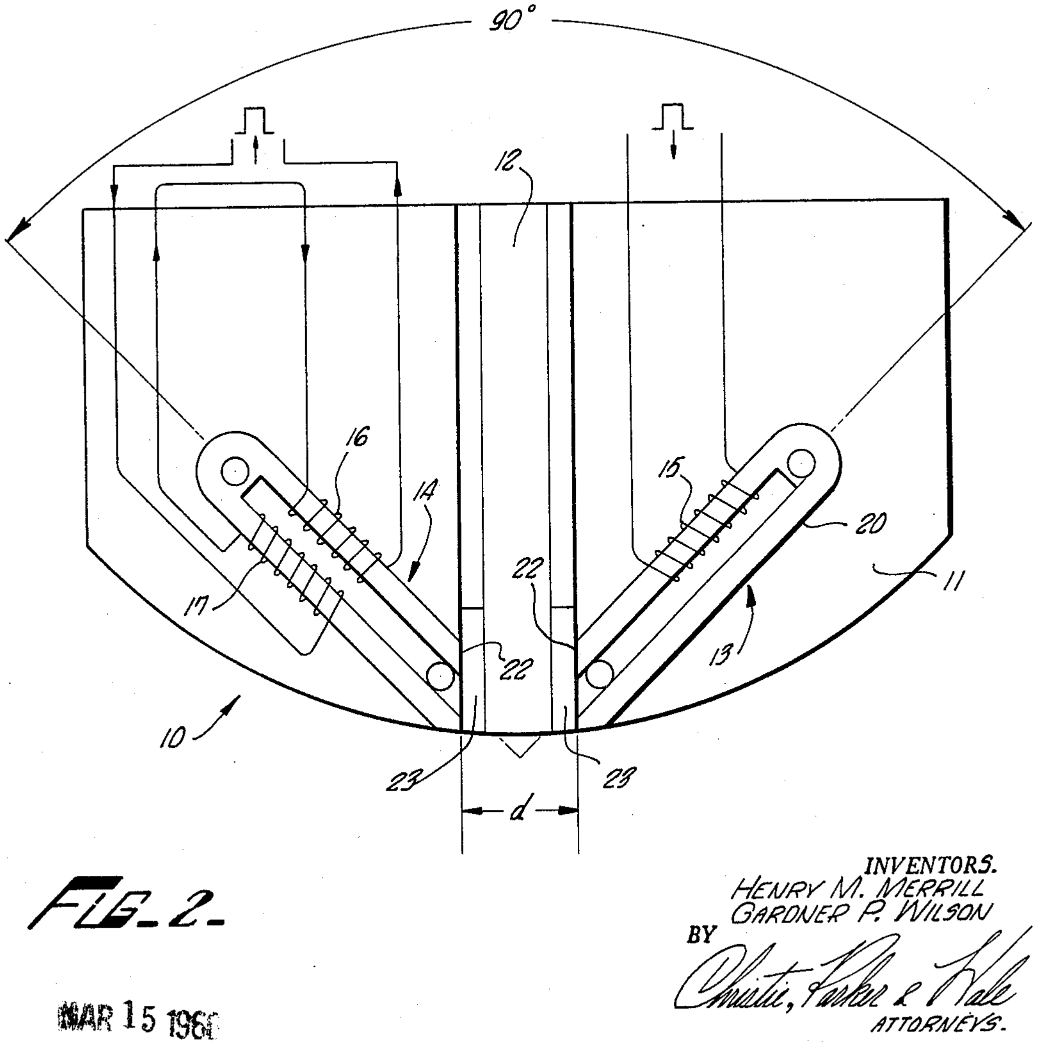

These and other features of the present invention may be more fully appreciated when considered in the light of the following specification and drawings, in which:

FIGURE 1 is a schematic representation of a prior art dual gap magnetic transducer; and FIGURE 2 is a schematic representation of the dual gap magnetic transducer embodying the present invention.

Before considering the structural organization of the dual gap heads of this invention, a brief consideration of the prior art techniques for effecting the write-check feature will be examined in conjunction with FIG. 1. Conventionally, magnetic transducers have either a single gap or a dual gap and have been constructed in terms of stack C–I magnetic laminations wherein the high reluctance gaps are defined between the C–I laminations. When a pair of C–I electromagnetic structures are incorporated into a single head for simultaneous reading and writing, the electromagnetic structures are generally arranged in a parallel relationship whereby the flux emanating from one position is coupled to the other portion and whereby the flux links the coil mounted thereon in a parallel relationship to produce a maximum cross-coupling or cross-talk. As is well known, a minimum cross-coupling results when the flux links a coil at an angle of 90 degrees.

Physically, as may be appreciated from examining FIG. 1, the C–I configuration is rectangular and, therefore, does not provide a smooth flux path due to the sharp corners present. These corners result in flux leakage and reduce the overall efficiency of the transducer, leading to the requirement for higher writing currents, for example. It is also well known that this leakage problem is minimized through the use of a torroidal magnetic structure.

Theoretically, at least, the most desirable physical form for an electromagnetic structure for use in a dual gap transducer is to employ a pair torroidal magnetic cores side by side. However, to produce an inter-gap spacing for introducing a small time delay as desired for digital applications, or a spacing on the order of .150 inch, requires the use of torroids having a diameter that is so small that it is not practical to wind the reading and writing coils thereon. Therefore, the C–I type of magnetic structure has been largely resorted to heretofore.

Dual gap magnetic transducers utilizing C–I electromagnetic structures as shown in FIG. 1 have been developed and are in commercial use wherein the reading and writing gaps are spaced apart by a magnetic shielding member. The inter-gap spacing as represented by $d$ in FIG. 1, however, is generally much larger than the desired .150 inch gap with the techniques of the present invention. Furthermore, the parallel arrangement of the magnetic structures maximizes the cross-coupling between the read and write coils and in many cases necessitates further external shielding to allow the transducer to be used.

Now referring to FIG. 2, the structural organization of the dual gap head of the present invention will be described in more detail. The dual gap magnetic read-write transducer 10 comprises a substantially nonmagnetic body 11 mounting a conventional magnetic shielding member 12 arranged substantially centrally of the body 11. A pair of independent, closed loop, low reluctance magnetic structures 13 and 14 are arranged on the nonmagnetic body 11 on opposite sides of the magnetic shield 12. The magnetic structure 13 carries a coil 15 which may be considered to be a writing coil, while the magnetic structure 14 is shown with a pair of coils 16 and 17 mounted on opposed portions thereof. It should be noted that the structural organization of the transducer 10 is completely symmetrical and that the functions of the magnetic structures 13 and 14 may be interchanged, that is, the magnetic structure 14 may be utilized as the writing portion of the transducer while the magnetic structure 13 may be utilized as the reading portion to allow bidirectional action when required.

The general configuration of the magnetic structures 13 and 14 can be similarly characterized as generally a nonrectangular, elongated closed loop, magnetic structure comprised of a low reluctance material, and only one of these structures need be considered for the present. The magnetic structure 13 may comprise an elongated U-shaped portion 20 having the open end of the U closed by a high reluctance transducing member 22 arranged intermediate the magnetic shield 12 and the open ends of the U-shaped portion 20. The magnetic structure 13 includes the provision of a low reluctance member 23 between the high reluctance member 22 and the magnetic shield member 12 preferably of the same material as the U-shaped portion 20. It should, therefore, now be apparent that the members 20, 22, and 23 form an independent, closed magnetic loop. The members 22 and 23 may be mounted coextensive with the magnetic shield 12. This magnetic structure 13 is further arranged so that the portion of the high reluctance member 22 providing the transducing action is mounted coextensive with an exposed surface of the nonmagnetic body 11 adjacent the magnetic shield member 12, as shown. The inner end of the magnetic structure 13 is then oriented with respect to the center line of the magnetic shield member 12 at approximately 45 degrees thereto in diverging relationship (clockwise). The arrangement and configuration for the electro-magnetic structure 14 is essentially the same except that its orientation is at a 45 degree angle in a counterclockwise direction. In this fashion, then, it will be seen that the spacing between the transducing member 23 is governed by the longitudinal dimensions of the magnetic shield 12 and in one embodiment this dimension is on the order of .150 inch, although inter-gap spacing down to .050 inch is practical following the teachings of this invention. Furthermore, with the orientation of the magnetic structures 13 and 14 arranged in a diverging relationship with respect to the magnetic shield 12, an overall angle of approximately 90 degrees is attained between the magnetic structures 13 and 14 to provide the desired minimum cross-coupling action between these reading and writing portions.

Considering the magnetic structure 14 as the reading or checking portion of the transducer 10, the oblong or U-shaped configuration of the magnetic structure provides a further advantage in that it allows a pair of coils to be mounted on opposed portions thereof whereby the voltages generated by stray flux cutting across these coils tend to buck out one another and thereby reduce any noise or cross-coupling tending to override the signal read from the magnetic carrier. The coils 16 and 17 are connected in a series-aiding relationship with respect to flux changes produced therein as a result of reading the information on a magnetic carrier but, since stray flux cutting these coils cuts them in the same direction, they produce flux having opposite orientations. In addition, since the overall configuration of the magnetic structure 13 approaches that of a torroidal configuration rather than a rectangular or C–I structure, leakage is at a minimum and the efficiency of this structure is very high. Stated differently, the current provided for the writing coil 15 is largely used for effecting the recording of the information on the magnetic carrier. Therefore, this minimizes the amount of current that must be applied to the writing coil 15 and also the shielding as a result of the minimum leakage.

What is claimed is:

1. A magnetic transducer for reading and writing simultaneously on a single track of a magnetic carrier comprising a substantially non-magnetic body having a pair of spaced, closed loop magnetic portions each including an exposed high reluctance transducing gap therein arranged in the same plane for reading and writing simultaneously, a magnetic shield arranged between said transducing gaps carried by said body to shield the transducing gaps from one another, said magnetic portions being arranged in a divergent relationship relative to said inter-gap magnetic shield for minimizing cross-coupling, and at least a single transducing winding individually coupled to each of said magnetic portions for defining the read and write transducers.

2. A magnetic transducer comprising a substantially nonmagnetic body mounting a magnetic shielding member, a pair of oblong, low reluctance, closed loop electromagnetic structures each having a high reluctance transducing portion therein arranged with a portion in engagement with opposite sides of said shielding member to position the transducing portions in the same plane adjacent said shielding member and along an exposed surface of said body, the shielding member being narrowly defined to allow one of the transducing gaps to function for magnetic writing while the other transducing gap functions substantially simultaneously for immediately reading the information written by said one gap when their corresponding electromagnetic structures are energized, the non-exposed ends of the electromagnetic structures being oriented outwardly at approximately 45 degrees relative to said shielding member.

3. A magnetic transducer as defined in claim 2 wherein said transducing portions are spaced apart on the order of .150 inch.

4. A dual gap transducer for simultaneously reading and writing a magnetic carrier comprising a substantially nonmagnetic body, a magnetic shielding member carried by said body, a pair of oblong, low reluctance magnetic structures defining independent, closed loop flux paths arranged on said body on opposite sides of the shielding member and extending angularly outwardly therefrom at approximately 45 degrees, each of said magnetic structures being defined with a transducing gap arranged adjacent said shielding member and aligned in the same plane on an exposed surface of said body for effecting successive transducing operations on the same piece of information on a magnetic carrier, the time delay between the successive transducing operations being governed by the inter-gap spacing effeced by said shielding member, winding means magnetically coupled to one of said magnetic structures for effecting a writing operation, and a pair of windings wound on magnetically opposed portions of the other magnetic structure for effecting a reading operation.

5. A dual gap transducer for simultaneously reading and writing on a magnetic carrier comprising a substantially nonmagnetic body, a magnetic shielding membe carried by said body, a pair of elongated U-shaped, low reluctance magnetic structures arranged on opposite sides of the shielding member and in the same plane with the open ends facing said shielding member and extending angularly outwardly therefrom for minimizing the cross-coupling between the magnetic structures, a high reluctance member arranged intermediate said shielding member and said magnetic structures for closing the open end thereof and having a portion coextensive with an exposed surface of said body for effecting a transducing operation on a magnetic carrier, a magnetic member arranged on opposite sides of the shielding member and in intimate engagement with the adjacent high reluctance member to form a closed magnetic path with the adjacent U-shaped structures and the high reluctance member, and at least a singlewinding means magnetically coupled to each of said U-shaped portions.

6. A dual gap transducer as defined in claim 5 wherein one of said winding means functions for writing information on a magnetic carrier and the other of said windings functions for reading information from a magnetic carrier, said reading winding means comprising a pair of coils wound on geometrically opposed portions of said U-shaped structure and electrically connected in a series aiding relationship for reading but in a magnetically opposed relationship relative to stray magnetic flux cutting across said U-shaped structure.

7. A dual gap transducer as defined in claim 6 wherein said U-shaped structures are arranged for approximating a right angle.

8. A magnetic transducer for reading and writing simultaneously on a single track of a magentic carrier as defined in claim 1 wherein the closed loop magnetic portion for at least the reading transducer is defined with a configuration having a pair of geometrically opposed arms for receiving a coil on each arm and wherein the coils are electrically connected in a series aiding relationship for reading from the magnetic carrier but in a magnetically opposed relationship relative to stray magnetic flux cutting across said transducer.

References Cited by the Examiner

UNITED STATES PATENTS

| | | | |
|---|---|---|---|
| 2,922,231 | 1/1960 | Witt et al. | 340—174.1 |
| 3,037,089 | 5/1962 | Warren | 179—100.2 |
| 3,165,592 | 1/1965 | Brette | 179—100.2 |
| 3,185,971 | 5/1965 | Brette et al. | 340—174.1 |

FOREIGN PATENTS

| | | |
|---|---|---|
| 1,222,229 | 1/1960 | France. |
| 1,270,817 | 7/1961 | France. |
| 802,210 | 10/1958 | Great Britain. |
| 913,296 | 12/1962 | Great Britain. |

IRVING SRAGOW, *Primary Examiner.*

R. M. JENNINGS, F. C. WEISS, *Assistant Examiners.*